(12) United States Patent  
Smeets et al.

(10) Patent No.: US 8,857,531 B2  
(45) Date of Patent: Oct. 14, 2014

(54) SOIL TREATING TOOL WITH HARDENED CUTTING ELEMENT

(75) Inventors: Florian Smeets, Baiersbronn (DE); Ulrich Kraemer, Wolfach (DE)

(73) Assignee: Betek GmbH & Co. KG (DE)

( * ) Notice: Subject to any disclaimer, the term of this patent is extended or adjusted under 35 U.S.C. 154(b) by 0 days.

(21) Appl. No.: 13/377,857

(22) PCT Filed: May 28, 2010

(86) PCT No.: PCT/EP2010/057392  
§ 371 (c)(1),  
(2), (4) Date: Feb. 23, 2012

(87) PCT Pub. No.: WO2010/149464  
PCT Pub. Date: Dec. 29, 2010

(65) Prior Publication Data  
US 2012/0145421 A1    Jun. 14, 2012

(30) Foreign Application Priority Data  
Jun. 23, 2009   (DE) .......................... 10 2009 029 894

(51) Int. Cl.  
*A01B 35/26*    (2006.01)  
*A01B 39/20*    (2006.01)  
*A01B 15/06*    (2006.01)

(52) U.S. Cl.  
CPC ...................................... *A01B 15/06* (2013.01)

USPC ............................ 172/772.5; 37/455; D15/32

(58) Field of Classification Search  
USPC ........... 37/455, 452, 443, 450, 444, 403, 407, 37/903; 172/772.5, 772, 749, 753, 704, 172/701.3; 299/102, 850.2; D15/32, 29  
See application file for complete search history.

(56) References Cited

U.S. PATENT DOCUMENTS

| 53,491 | A | | 3/1866 | Saladee et al. |
| 422,566 | A | * | 3/1890 | Briggs ............................ 125/38 |

(Continued)

FOREIGN PATENT DOCUMENTS

| DE | 488478 C | 12/1929 |
| DE | 1969592 U | 9/1967 |

(Continued)

OTHER PUBLICATIONS

Exhibit A—drawing of prior art soil working tool having a hard metal plate soldered to the tool (undated but admitted to be prior art).

(Continued)

*Primary Examiner* — Árpád Fábián-Kovács  
(74) *Attorney, Agent, or Firm* — Waddey & Patterson, P.C.; Lucian Wayne Beavers

(57) ABSTRACT

A soil working tool for an agricultural machine includes a carrier that comprises a cutting region having a cutting edge, and one or more hard-material elements being arranged in the cutting region. The hard-material element is a cutting element that forms at least a part of the cutting edge.

29 Claims, 10 Drawing Sheets

(56) References Cited

U.S. PATENT DOCUMENTS

| | | | | |
|---|---|---|---|---|
| 872,439 | A | * | 12/1907 | Livengood ........................ 37/446 |
| 995,285 | A | * | 6/1911 | Pemberton ........................ 37/456 |
| 1,772,624 | A | * | 8/1930 | Brendlin .......................... 37/449 |
| 1,963,847 | A | * | 6/1934 | Jersey ............................. 37/446 |
| 3,497,973 | A | * | 3/1970 | Campbell ......................... 37/446 |
| 3,550,293 | A | * | 12/1970 | Helton ............................ 37/450 |
| 3,685,177 | A | * | 8/1972 | Hahn et al. ...................... 37/446 |
| 3,775,879 | A | * | 12/1973 | Quick ............................. 37/460 |
| 4,127,952 | A | * | 12/1978 | Chamberlain .................... 37/450 |
| 4,363,364 | A | | 12/1982 | Wetmore |
| 4,391,050 | A | * | 7/1983 | Smith et al. ...................... 37/455 |
| 4,449,309 | A | * | 5/1984 | Hemphill ......................... 37/444 |
| 4,660,361 | A | * | 4/1987 | Remillard et al. ................ 56/297 |
| 5,152,087 | A | * | 10/1992 | Maguina-Larco ................ 37/452 |
| 5,224,555 | A | * | 7/1993 | Bain et al. ................... 172/772.5 |
| 5,711,378 | A | * | 1/1998 | Yeager ........................... 172/730 |
| 5,746,017 | A | | 5/1998 | Marvik |
| 6,230,424 | B1 | * | 5/2001 | Renski et al. .................... 37/446 |
| 7,451,558 | B2 | * | 11/2008 | Jones ............................... 37/452 |
| 7,596,895 | B2 | * | 10/2009 | Jones et al. ...................... 37/452 |
| 7,793,444 | B2 | * | 9/2010 | Jones et al. ...................... 37/456 |
| 7,971,375 | B2 | * | 7/2011 | Gabela et al. .................... 37/455 |
| 8,464,443 | B2 | * | 6/2013 | Torgrimsen ...................... 37/444 |
| 2006/0231275 | A1 | | 10/2006 | Bull et al. |

FOREIGN PATENT DOCUMENTS

| | | |
|---|---|---|
| DE | 7309996 U | 7/1973 |
| DE | 2655792 A1 | 6/1978 |
| DE | 3329009 A1 | 6/1984 |
| DE | 3720924 A1 | 1/1989 |
| DE | 102004034093 A1 | 2/2006 |
| DE | 102004040367 A1 | 3/2006 |
| EP | 0923851 A1 | 6/1999 |
| FR | 2617669 A1 | 1/1989 |
| WO | 2008000989 A2 | 1/2008 |

OTHER PUBLICATIONS

"Bainitisches Gusseisen mit Kugelgraphit" German language article, 6 pages, undated.

"CLAASGUSS Technisches Handblatt Nr. 8" on Bainitisches Gusseisen mit Kugelgraphit EN-GJS-800 . . . 1400 (ADI), German language technical handout sheet, 2 pages, undated.

"Frontlader Werkzeugprogramm Stoll Originalwerkzeug" German language product manual, 16 pages, undated.

Nullity action against the German Utility Model No. DE 20 2009 008582 U1 dated on May 15, 2013, 14 pages (not prior art).

Response to the German Patent Office (Response to the nullity action) dated Jul. 3, 2013, 13 pages (not prior art).

Submission of the opponent dated Nov. 11, 2013, 8 pages (not prior art).

Submission of the opponent dated Oct. 21, 2013, 4 pages (not prior art).

Submission of the opponent dated Aug. 27, 2013, 16 pages (not prior art).

Machine translation of submission of the opponent dated Aug. 27, 2013, 16 pages (not prior art).

Machine translation of submission of the opponent dated Oct. 21, 2013, 4 pages (not prior art).

Machine translation of submission of the opponent dated Nov. 11, 2013, 8 pages (not prior art).

Machine translation of nullity action against the German Utility Model No. DE 20 2009 008582 U1 dated on May 15, 2013, 14 pages (not prior art).

Machine translation response to the German Patent Office (Response to the nullity action) dated Jul. 3, 2013, 13 pages (not prior art).

* cited by examiner

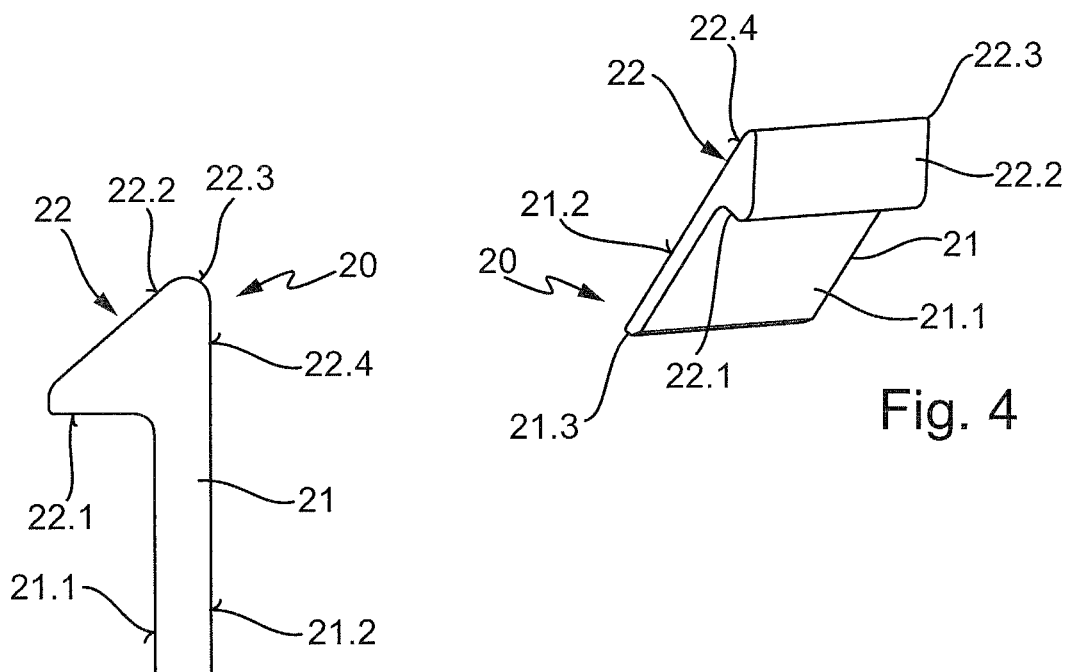
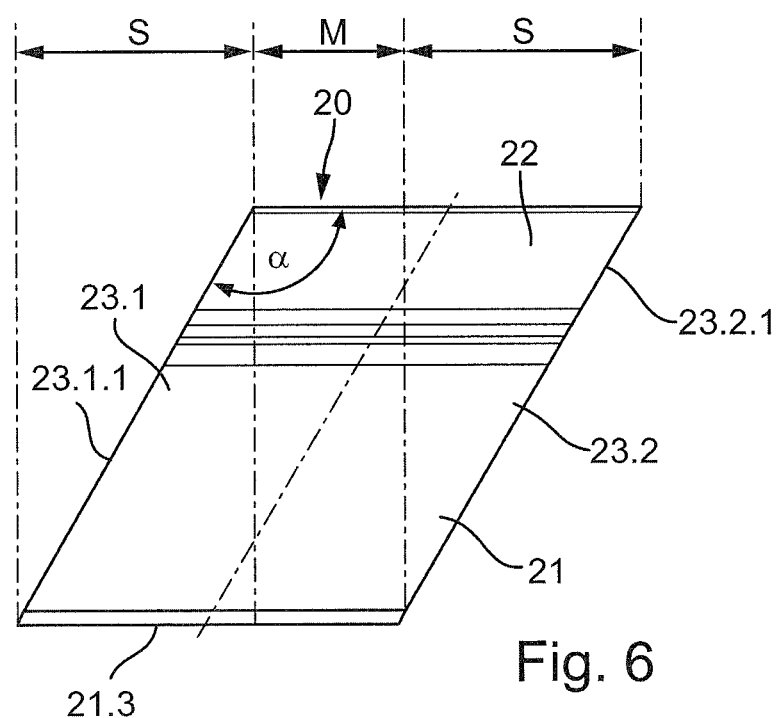

SOIL TREATING TOOL WITH HARDENED CUTTING ELEMENT

BACKGROUND OF THE INVENTION

1. Field of the Invention

The invention relates to a soil working tool for an agricultural machine, in particular a plow point, plowshare, or cultivator tip, having a carrier that comprises a cutting region having a cutting edge, one or more hard-material elements being arranged in the cutting region.

2. Description of the Prior Art

Numerous variant embodiments of plowshares and cultivator tools are known from the existing art. Plowshares, for example, are traditionally forged from an iron material. In this context, the nature of the material needed to be such that it was sufficiently tough not to break under abrupt stresses, for example upon striking a stone. Sufficient hardness to resist abrasive wear was also required. Because these properties do not always occur in optimally paired fashion, cutting elements made of hard material, for example cemented carbide, were applied in the cutting region of the carrier.

It was thereby possible to achieve an extension in service life. With such tool forms, a failure usually occurs when, as a result of abrasive attack of the removed material, the carrier material becomes eroded in the region behind the hard-material element. The necessary support is then absent, and the hard-material element breaks off.

SUMMARY OF THE INVENTION

It is an object of the invention to create a soil working tool of the kind mentioned above that exhibits an optimized service life.

This object is achieved by the fact that the hard-material element is a cutting element that forms at least a part of the cutting edge.

According to the present invention, the function of the hard-material element is expanded, and its geometry is configured in such a way that it also forms the cutting edge. A considerable extension in service life is thereby achieved. The erosion effect as a result of abrasive attack of the removed material is also considerably reduced. A further improvement can be achieved in this context when provision is made for the cutting element to comprise a mounting piece that is directed in the advance direction, and for an extension, protruding oppositely to the advance direction, to be shaped onto the cutting element. The region of the carrier adjoining the cutting edge can be covered with the extension, and protected from erosion. This additionally results in a considerable increase in service life. The advantage that the service lives of the cutting element and of the carrier can be matched to one another is also achieved. The material outlay required for the expensive hard material can thereby be optimized.

If provision is made that the carrier comprises, in the cutting region, a receptacle in which the cutting element is fastened by material attachment to the mounting piece; and that the cutting element comprises a deflection surface that transitions flush into the front side of the carrier, good discharge of the removed material can then be guaranteed. The cutting element can, for example, be soldered or adhesively bonded to the carrier.

The cutting elements are accommodated in protected fashion in the receptacle.

A particularly preferred configuration of the invention is such that the cutting element forms the rounded cutting edge. The rounded cutting edge ensures good tool engagement into the soil, such that as a result of the material properties of the hard material, e.g. cemented carbide, a resharpening effect and protection from breakout occur, ensuring consistent work results.

In this context, provision can be made in particular that the rounding radius of the cutting edge is in the range between 0.1 mm and 15 mm. These geometries result in a sharp-edged tool engagement while at the same time the risk of edge breakage is minimized and, in the case of cemented carbide, an optimal resharpening effect takes place.

In order to minimize as much as possible the necessary engagement force and consequently the drive power output of the towing machine, and to set the engagement angle of the tool reliably, provision can be made for the cutting element to form, oppositely to the advance direction, an exposed surface inclined with respect to the advance direction.

Particularly good results have become apparent over the entire service life of the cutting element when provision is made that the exposed surface is inclined in the range between $\alpha=20°$ and $\alpha=70°$ with respect to the advance direction.

A simple tool geometry results from the fact that the rounded cutting edge forms a transition between a front-side cutting surface and the back-side exposed surface.

A particularly preferred variant of the invention is such that the cutting element is braced, with a supporting segment of the extension, on a counter-surface of the carrier. Improved energy dissipation into the carrier thereby occurs, making possible an additionally material-optimized geometry of the cutting element.

In order to allow the soil working tool to be produced simply, it is conceivable for the carrier to comprise in the cutting region a recess in the form of a milled cavity in which the cutting element(s) is/are received.

If provision is made that two or more cutting elements form at least a part of the cutting edges, the cutting elements being arranged next to one another transversely to the advance direction, the stresses in the cemented carbide are then reduced by way of the distribution of the cutting edge over multiple elements, and the risk of breakage of the cemented carbide is thus considerably reduced.

Additional wear protection can be achieved by the fact that one or more hard-material coverings are arranged in the region of the front side of the carrier.

It is advantageous in this context for the hard-material coverings to be inserted into recesses of the carrier. The hard-material coverings in the recesses are protected from the action of transverse forces of the removed material.

BRIEF DESCRIPTION OF THE DRAWINGS

The invention will be further explained below with reference to exemplifying embodiments depicted in the drawings, in which:

FIG. 4 is a perspective rear view of a cutting element, FIG. 5 is a side view of the cutting element according to FIG. 4, FIG. 6 is a view from behind of the cutting element according to FIG. 4.

DETAILED DESCRIPTION

Figure 1:
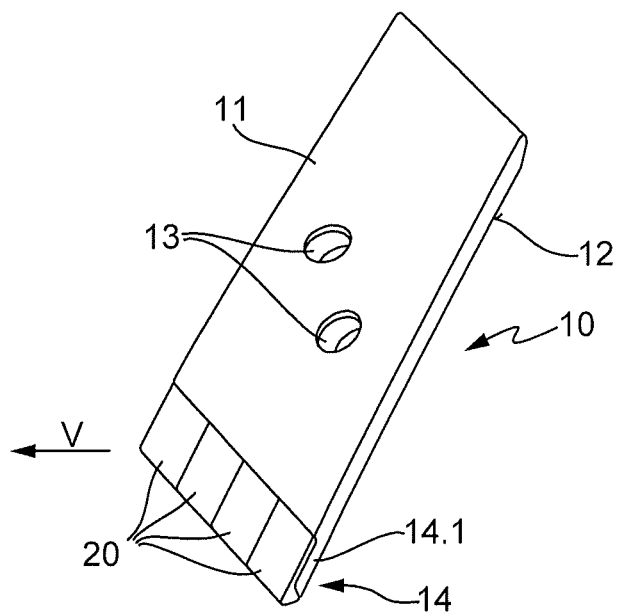
FIG. 1 is a perspective front view of a plowshare embodied as a working tool.
Figure 2:
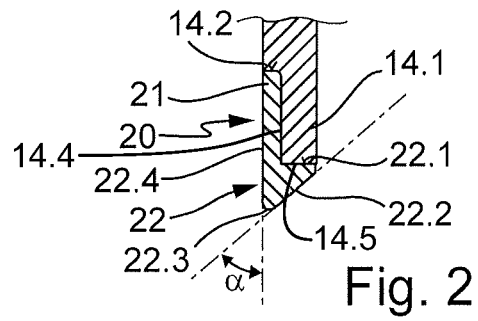
FIG. 2 is a detailed depiction taken from FIG. 1, in a side view and in section.

FIG. 1 shows a plow point having a carrier 10, as a forged, thermally cut, sintered steel, or cast part or the like, made of a tough and resilient material. Carrier 10 comprises a front side 11 and a back side 12, and is penetrated by two mounting receptacles that serve for mounting onto a plow. A cutting region 14, whose configuration may be gathered in more detail from FIG. 2, is formed at the lower free end of carrier 10. As this depiction illustrates, carrier 10 possesses an extension 14.1 that forms, in a tongue shape, the free end of carrier 10. In the region of front side 11, extension 14.1 forms a recess 14.2 in the shaped of a milled recess. Recess 14.2 forms a flat abutting surface, directed in the advance direction, for cutting elements 20.

The configuration of cutting element 20 may be gathered in more detail from FIGS. 4 to 6. Cutting element 20 is configured substantially in an L-shape and comprises a limb-like mounting piece 21 that is adjoined at an angle by an extension 22. Extension 22 protrudes out from mounting piece 21 on the back side, i.e. oppositely to advance direction V.

Extension 22 has a supporting segment 22.1 in the form of a flat surface. The latter is at an angle to a back-side contact surface 21.1 of mounting piece 21. For optimized energy dissipation, contact surface 21.1 and supporting segment 22.1 preferably enclose an angle in the range between 120° and 10°. Mounting piece 21 forms on the front side a flat deflection surface 21.2 that transitions flush into a cutting surface 22.4 of extension 22. Cutting surface 22.4 transitions in turn into a cutting edge 22.3. Cutting edge 22.3 forms a transition region between cutting surface 22.4 and a back-side exposed surface 22.2. Exposed surface 22.2 is at an angle to cutting surface 22.4; a reliable resharpening effect can be achieved for the cutting edge, as wear progresses, when the angle is selected to be in the range between 0° and 179°. The rounding radius of cutting edge 22.3 is appropriately selected so as to ensure a sharp tool engagement along with sufficient cutting stability.

As is evident from FIG. 6, cutting element 20 is in the shape of a parallelogram, a middle region M and two side regions S being formed. In the present example, side regions S are joined to middle region M in such a way that a cutting angle in the range between α>=90 and <150° is enclosed between the upper horizontal delimiting line of cutting edge 22.3 and a cutting surface 23.1.1 or 23.1.2. These cutting angles are especially optimal for soil working.

As is evident from FIG. 1, four cutting elements 20 are soldered into recess 14.2, located next to one another transversely to advance direction V, to form cutting region 14. Mounting piece 21 rests with its contact surface 21.1 on the flat front surface 14.4 of recess 14.2. Deflection surface 21.2 transitions flush into front side 11 of carrier 10. Recess 14.2 is embodied so that mounting pieces 21 of all the cutting elements 20 are supported over their entire surface. Extensions 22 rest with their supporting segments 22.1 on the exposed end face 14.5 of extensions 14.1 for optimum mounting with the interposition of solder material, thus resulting in bracing and simultaneously in edge protection and protection from erosion.

Figure 3:
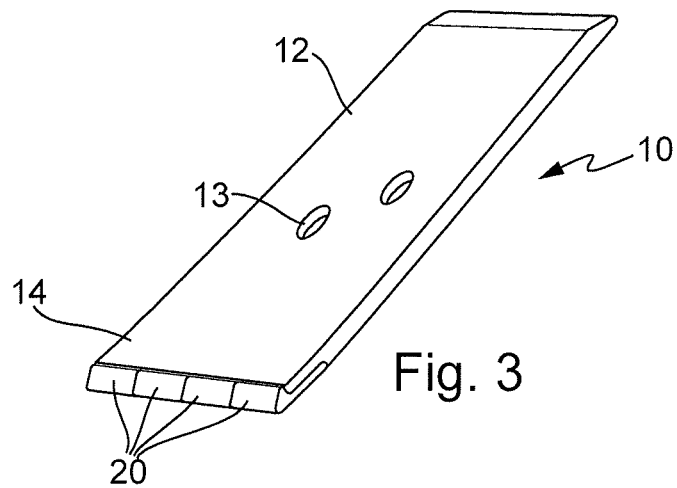
FIG. 3 is a view from behind of the plowshare according to FIG. 1.
Figure 7:
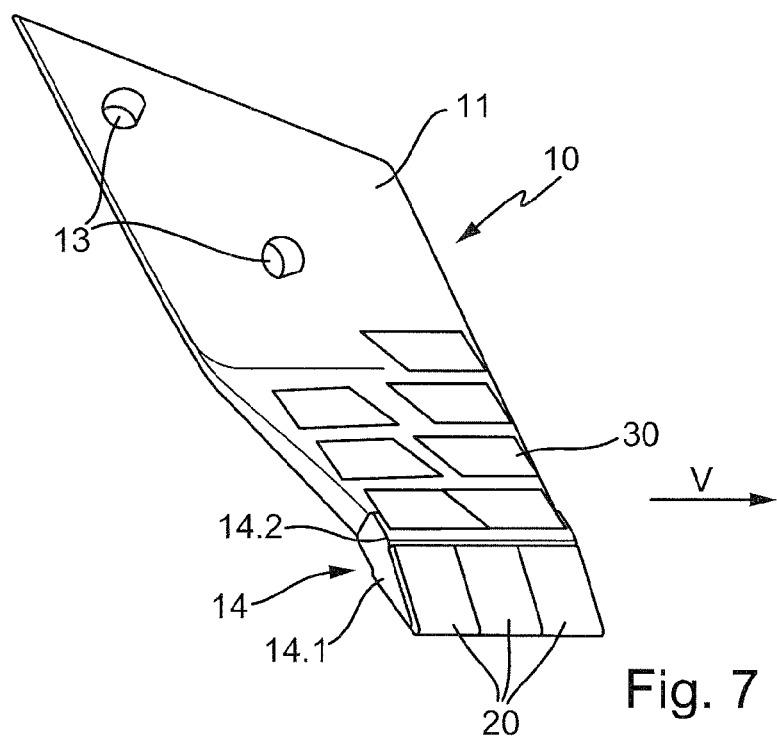
FIG. 7 is a perspective front view of a further embodiment of a plowshare.
Figure 8:
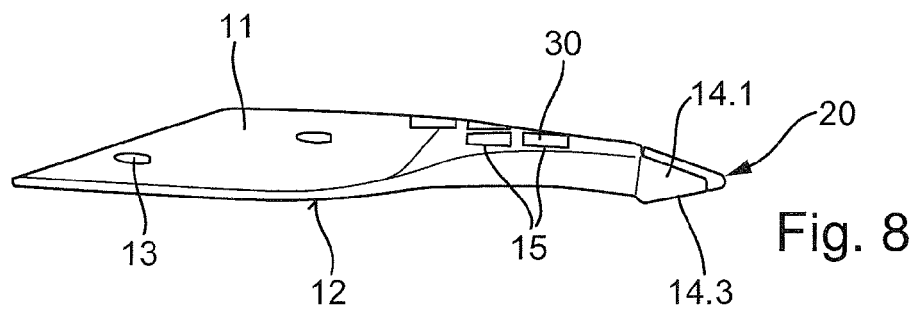
FIG. 8 is a side view of the plowshare according to FIG. 7.

FIGS. 7 and 8 show a further variant embodiment of a plowshare. This has, in principle, a construction similar to that of the plowshare according to FIGS. 1 and 3; reference is therefore made to the statements above, and only the differences will need to be discussed. Three cutting elements 20 according to FIGS. 4 to 6, arranged next to one another, are utilized in cutting region 14. As may be gathered from FIG. 8, back side 12 of carrier 10 comprises a connecting surface 14.3 that is set at an angle to recess 14.2 and preferably correspondingly to the angle of exposed surface 22.2 of cutting element 20.

This results in a thickening and thus stiffening of extension 14.1. Recesses 15 are inset into front side 11 in order to improve wear properties, and hard-material coverings 30 made of cemented carbide or another harder material are mounted in them by soldering, adhesive bonding, or the like. Hard-material coverings 30 transition flush into front side 11.

Figure 9:
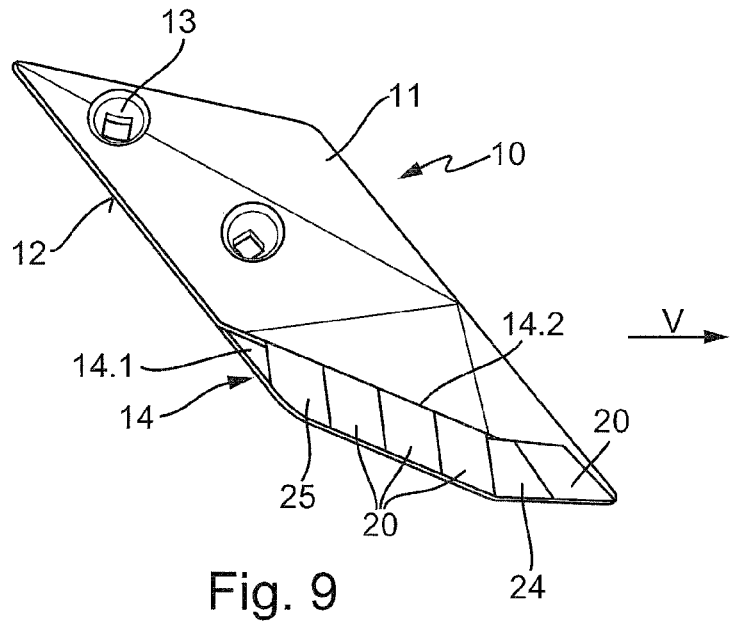
FIG. 9 is a perspective front view of a third variant embodiment of a plowshare.
Figure 10:
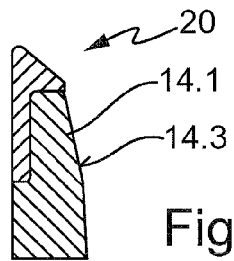
FIG. 10 is a detail depiction of the plowshare according to FIG. 9, in a side view and in section.
Figure 11:
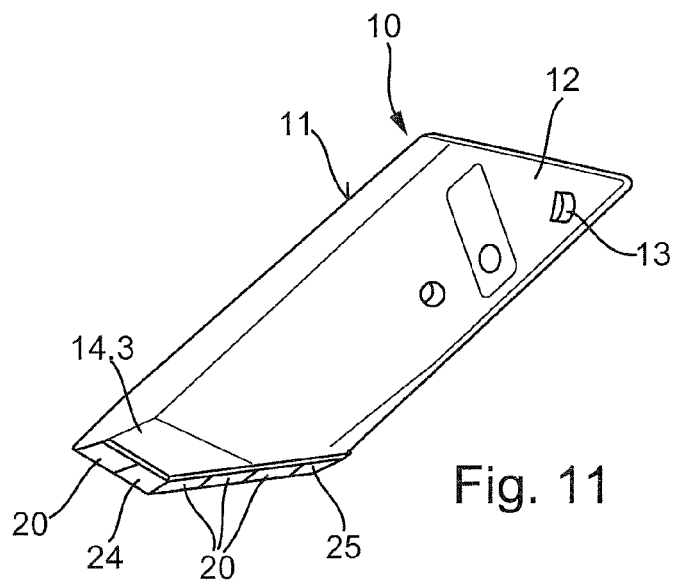
FIG. 11 is a perspective rear view of the plowshare according to FIG. 9.

FIGS. 9 to 11 show a further configuration of a plowshare. To avoid repetition, reference is made to the corresponding features of the plowshares according to FIGS. 1 to 3 and 7 and 8, and only the differences will be discussed below.

As is apparent from FIG. 9, extension 14.1 and thus recess 14.2 are configured in angled fashion. Soldered into this recess 14.2 are, beginning from the front (viewed in advance direction V) cutting region, firstly a cutting element 20 according to FIGS. 4 to 6, then a transition element 24, then three more cutting elements 20 according to FIGS. 4 to 6, and lastly an end piece 25.

Figure 12:
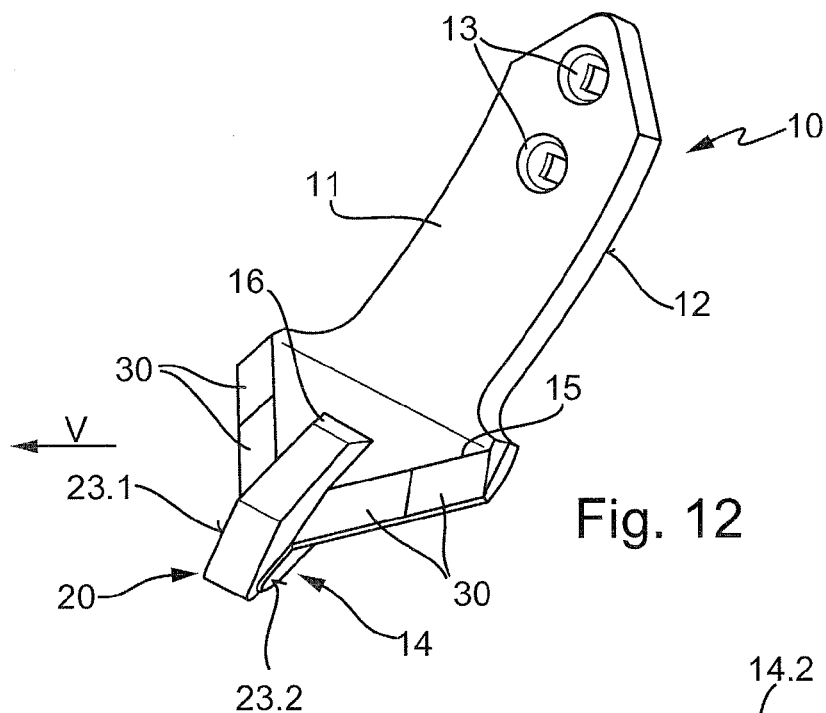
FIG. 12 is a perspective front view of a cultivator tip.
Figure 13:
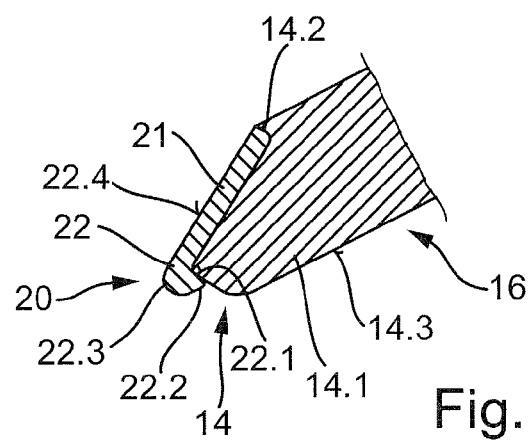
FIG. 13 is a detail depiction of the cultivator tip according to FIG. 12, in a side view and in section.
Figure 14:
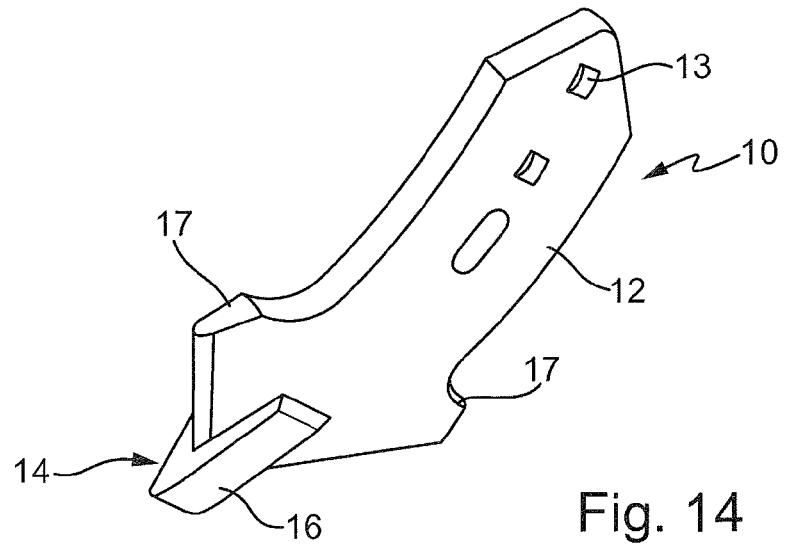
FIG. 14 is a perspective rear view of the cultivator tip according to FIG. 12, and FIGS. 15 to 37 show different variant embodiments of a cutting element.

FIGS. 12 to 14 show a cultivator tip as a soil working tool. Said tip comprises once again a carrier 10 having a front side 11 and rear side 12 as well as mounting receptacles 13. Carrier 10 is arrow-shaped in configuration, and has a protruding blade carrier 16 adjoined laterally by two arms 17. Blade carrier 16 is once again occupied, in the region of its exposed end, by a cutting element 20 that is soldered or adhesively bonded or the like into a recess 14.2.

Cutting element 20 corresponds substantially to the conformation of cutting element 20 according to FIGS. 4 to 6, although what is selected is not a parallelogram-like geometry but a shape symmetrical with respect to the center transverse plane, having two mutually parallel sides 23.1, 23.2.

Extension 22 is likewise slightly modified, and does not extend as far oppositely to the advance direction as does extension 22 according to FIGS. 4 to 6.

In order to reinforce arms 17, they are equipped in their edge regions that adjoin blade carrier 16 with hard-material coverings that are soldered on or bonded on or the like.

Figure 15:
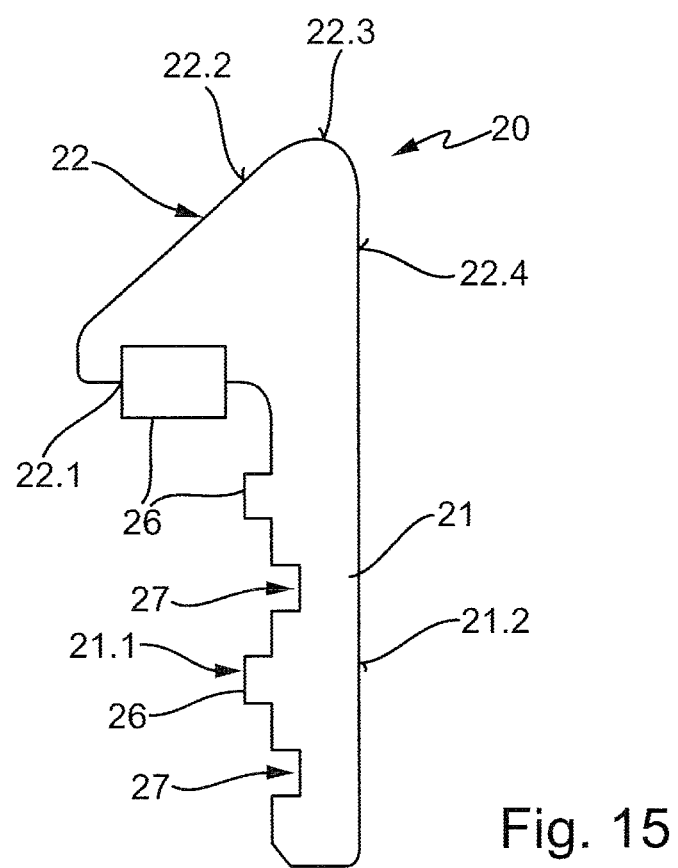

FIG. 15 depicts a further variant embodiment of a cutting element 20. Here cutting element 20 is equipped in the region of its supporting segment 22.1 and its contact surface 21.1 with projections 26 and depressed recesses 27.

Projections 26 serve in this context for positive engagement into corresponding recesses of carrier 10. Projections of carrier 10 are inserted positively into recesses 27. This results in a positive and hence stable fastening of cutting element 20 on carrier 10. Cutting element 20 can moreover be aligned, during production, in more accurately fitting fashion with respect to carrier 10. Displacement of cutting element 20 in the positive engagement direction upon mounting (soldering, adhesive bonding, etc.) is furthermore suppressed. For simplified assembly, recesses 27 can be stepped as depicted in FIG. 15 or can be configured to widen continuously toward carrier part 70.

Figure 16:
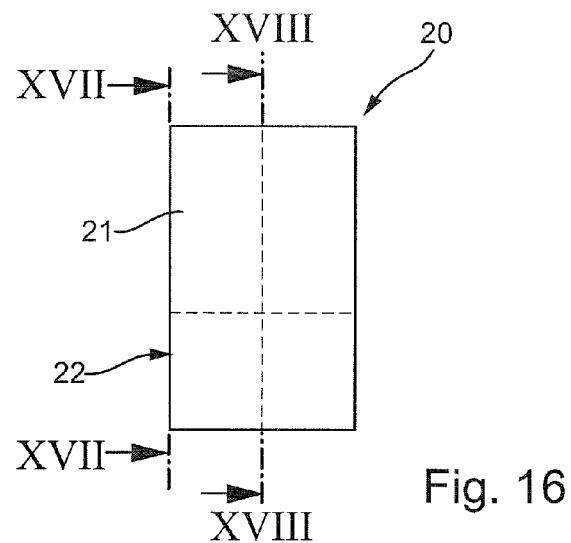
Figures 17, 18:
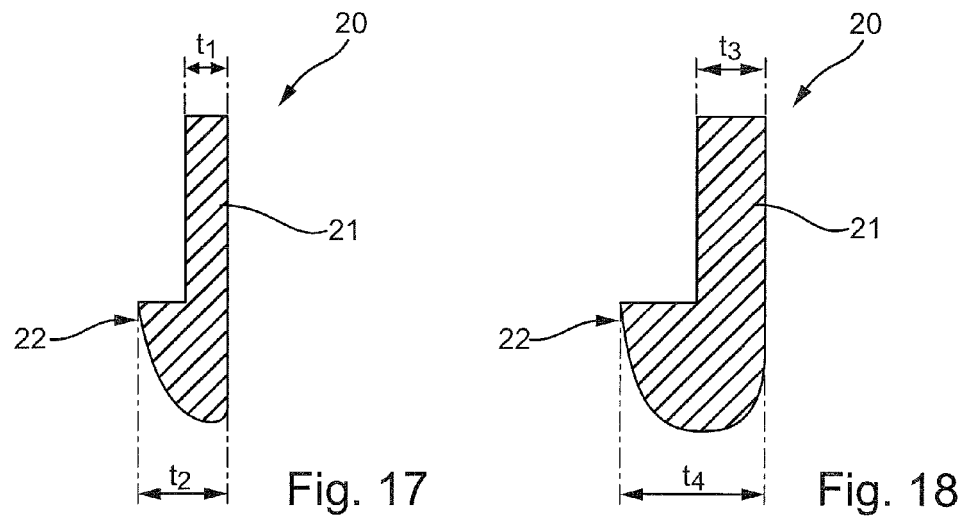
Figure 19:
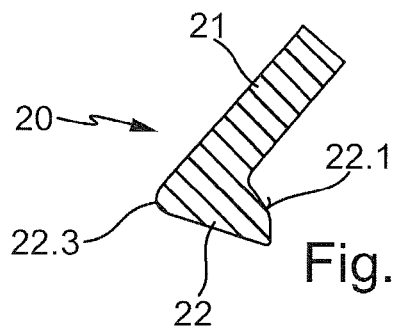

FIGS. 16 to 18 show a further variant embodiment of a cutting element 20. The latter once again comprises a mounting piece 21 having an extension 22, and is similar in principle to the tool configuration according to FIGS. 4 to 6.

As illustrated by FIGS. 17 and 18, which show cutting element 20 in section, the cross-sectional conformation of cutting element 20 changes continuously, such that the material thickness of mounting piece 21 and of the extension increases as viewed from left to right in FIG. 16. This is illustrated in FIGS. 17 and 18 by the material thickness indications $t_1$ to $t_4$, where $t_3 > t_1$ and $t_4 > t_2$.

FIGS. 19 to 23 show further cross-sectional shapes for cutting elements having a mounting piece 21 and an extension 22.

FIG. 19 once again illustrates the rounded cutting edge 22.3 which can have, for example, a radius in the range between 0.1 and 10 mm. Supporting segment 22.1 is convexly curved in the present case.

Figure 20:
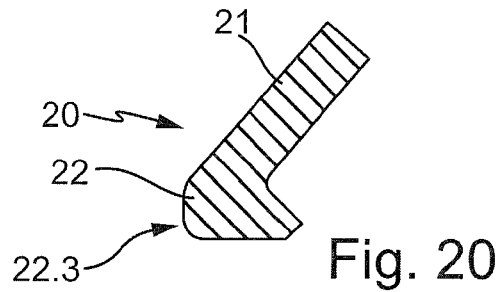

FIG. 20 shows that instead of the one rounded cutting edge 22.3, a cutting edge 22.3 assembled from polygon segments can also be used. This has greater fracture stability for rough operating conditions.

Figure 21:
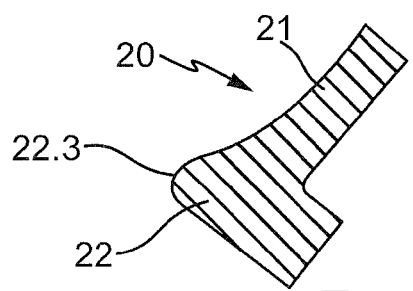
Figure 22:
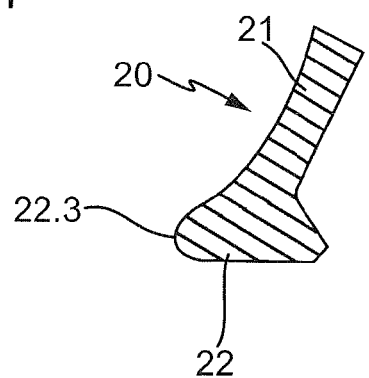

According to FIG. 21 and FIG. 22, the front side of cutting element 20 can exhibit a concave region that transitions into cutting edge 22.3 for a sharp-edged tool engagement.

FIG. 22 shows that the angle enclosed between supporting segment 22.1 and contact surface 21.1 can also be different from 90°. Sufficiently good energy transfer between cutting element 20 and carrier 10 is produced for angle ranges between 15° and 170°.

Figure 23:
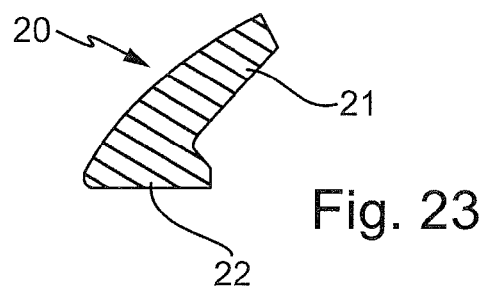

FIG. 23 illustrates the fact that mounting piece 21 also forms a convexly curved front-side region. This results in a greater material thickness, which leads to greater stability and wear life.

Figure 24:
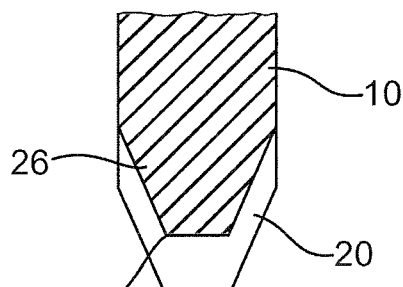
Figure 25:
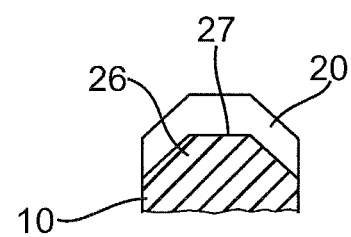
Figure 26:
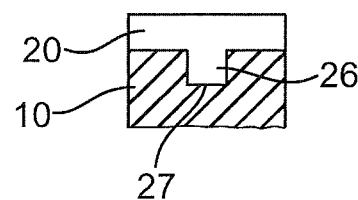
Figure 28:

FIGS. 24 to 26 show possible embodiments of the contact zone between carrier 10 and cutting element 20. The contact zone is constituted here by supporting segment 21.1 and the associated surface of recess 14.2 and/or by supporting segment 22.1 and the associated end face of carrier 10. As the drawings show, the contact zone is constituted by projections 26 and receptacles 27 that mesh (positively) into one another. Projections 26 and receptacles 27 are configured in this context in mirror-image fashion.

FIGS. 27 to 37 show further variants of cutting elements 20, these cutting elements 20 each exhibiting varying conformations in plan view.

Figure 27:
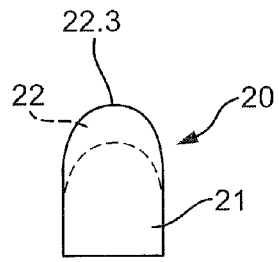
Figure 29:
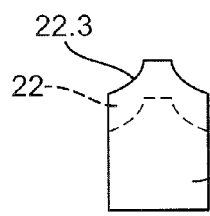
Figure 30:
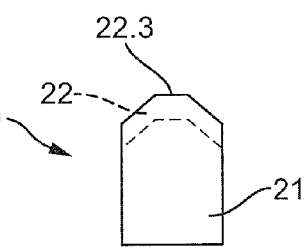

According to FIG. 27, cutting edge 22.3 is convexly rounded. According to FIG. 28 it can also be embodied with prongs. The cutting edge is equipped with two concave regions according to FIG. 29, or is polygonal according to FIG. 30.

Figure 31:
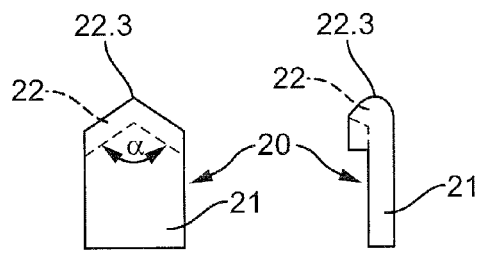
Figure 32:
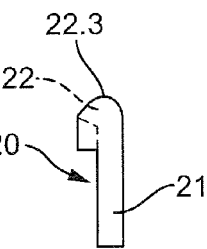
Figure 33:
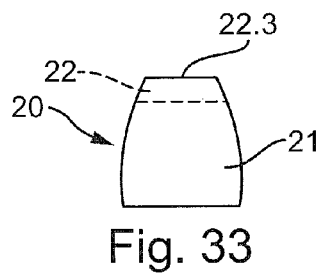

FIGS. 31 and 32 show a gable-like roof shape for cutting edge 22.3.

FIGS. 33 to 37 illustrate the fact that the lateral flanks of cutting element 20 can be embodied convexly (FIG. 33), concavely (FIG. 34) or in pyramidal fashion.

Figure 36:
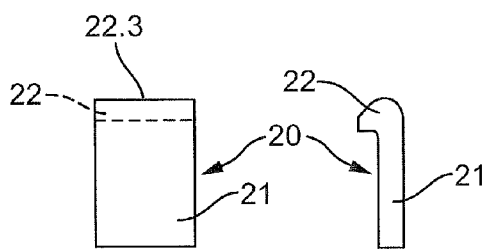
Figure 37:
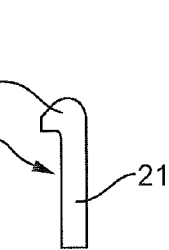
Figure 34:
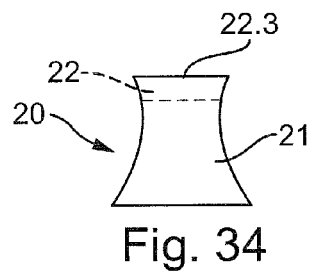
Figure 35:
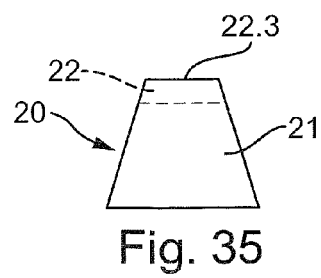

FIGS. 36 and 37 show parallel flanks.

The invention claimed is:

1. A soil working tool for an agricultural machine, comprising:
    a carrier including a cutting region, the carrier including a front side facing in an advance direction and a rear side facing oppositely from the front side, the cutting region of the carrier including an end face separating the front side of the carrier from the rear side of the carrier,
    one or more hard-material elements arranged in the cutting region, the hard material element being harder than the carrier, wherein the hard-material element is an L-shape cutting element having a cross section defined in an L-shape having a longer leg and a shorter leg, the longer leg defining mounting piece extending over and bonded by material attachment to the front side of the carrier and including a flat front facing deflection surface, and the shorter leg defining an extension formed on the mounting piece and protruding away from the front side of the carrier;
    wherein the extension of the cutting element is includes a support surface supported by and bonded by material attachment to the end face of the carrier, and the extension includes an exposed surface extending at an acute angle to the flat front facing deflection surface of the mounting piece; and
    wherein the cutting element includes a cutting edge joining the front facing deflection surface of the mounting piece and the exposed surface of the extension.

2. The soil working tool according to claim 1, wherein
    the carrier comprises, in the cutting region, a receptacle in which the mounting piece of the cutting element is fastened; and
    the deflection surface transitions flush into the front side of the carrier or in a manner protruding above the front side of the carrier.

3. The soil working tool according to claim 1, wherein the cutting element forms a rounded cutting edge.

4. The soil working tool according to claim 3, wherein a rounding radius of the cutting edge is in the range between 0.1 mm and 15 mm.

5. The soil working tool according to claim 1, wherein the exposed surface of the extension of the cutting element is inclined at an inclination angle $\alpha$ with respect to the front side.

6. The soil working tool according to claim 5, wherein the exposed surface is inclined in the range between $\alpha >= 20°$ and $\alpha <= 70°$ with respect to the front side.

7. The soil working tool according to claim 1, wherein the end face of the carrier defines a counter-surface of the carrier.

8. The soil working tool according to claim 1, wherein the carrier comprises in the cutting region a recess in the front side in the form of a milled cavity in which the cutting element is received.

9. The soil working tool according to claim 1, wherein two or more cutting elements form at least a part of the cutting edge, the cutting elements being arranged next to one another transversely to the advance direction.

10. The soil working tool according to claim 1, wherein one or more hard-material coverings are arranged in a region of the front side of the carrier.

11. The soil working tool according to claim 10, wherein the hard-material coverings are inserted into recesses of the carrier.

12. The soil working tool according to claim 1, wherein the cutting element comprises a middle segment and side extensions laterally adjacent to the middle segment on both sides, such that connecting regions form shaping-tool separating planes.

13. The soil working tool according to claim 1, wherein the material attachment of the cutting element to the carrier comprises soldering.

14. The soil working tool according to claim 1, wherein the material attachment of the cutting element to the carrier comprises adhesive bonding.

15. The soil working tool according to claim 1, wherein the extension of the cutting element terminates at or above an intersection of the end face of the carrier and the rear side of the carrier.

16. The soil working tool according to claim 1, wherein the hard-material element comprises cemented carbide.

17. A soil working tool for an agricultural machine, comprising:
    a carrier including:
        a front side;
        a rear side;
        an end face separating the front side from the rear side;
        a recess formed in the front side adjacent the end face, the recess including a front facing surface;
        one or more mounting receptacles defined through the carrier from the front side to the rear side for mounting the carrier to the agricultural machine; and
    at least one L-shape cutting element formed of a hard material harder than the carrier, the L-shape cutting element having a cross section defined in an L-shape having a longer leg and a shorter leg, the L-shape cutting element including:
        a mounting piece received in the recess and defining the longer leg of the L-shape, the mounting piece including a rear facing surface engaging and bonded to the front facing surface of the recess of the carrier, and the mounting piece including a flat front facing deflection surface; and
        an extension defining the shorter leg of the L-shape, the extension extending rearward from the mounting piece, the extension including a support surface supported by and bonded to the end face of the carrier, and the extension including an exposed surface extending at an acute angle to the flat front facing deflection surface of the mounting piece; and
        a cutting edge defined on the cutting element and joining the front facing deflection surface of the mounting piece and the exposed surface of the extension.

18. The soil working tool of claim 17, wherein the hard material of the cutting element comprises cemented carbide.

19. The soil working tool of claim 17, wherein;
    the flat front facing deflection surface of the mounting piece is flush with the front side of the carrier.

20. The soil working tool of claim 17, wherein the cutting edge has a radius in a range of 0.1 mm to 15 mm.

21. The soil working tool of claim 17, wherein the acute angle between the exposed surface of the extension and the flat front facing deflection surface of the mounting piece is in a range of from 20° to 70°.

22. The soil working tool of claim 17, wherein:
    the at least one L-shape cutting element comprises a plurality of L-shape cutting elements arranged side by side.

23. The soil working tool of claim 17, further comprising:
    one or more hard-material coverings arranged on the front side of the carrier.

24. The soil working tool of claim 23, wherein:
    the hard-material coverings are received in additional recesses formed in the front side of the carrier.

25. The soil working tool of claim 17, wherein the cutting element is bonded to the carrier by soldering.

26. The soil working tool of claim 17, wherein the cutting element is bonded to the carrier by adhesive bonding.

27. The soil working tool according to claim 17, wherein the extension of the cutting element terminates at or above an intersection of the end face of the carrier and the rear side of the carrier.

28. The soil working tool according to claim 17, wherein the front facing surface of the recess of the carrier and the end face of the carrier define a cutting region of the carrier, and the front facing surface of the recess of the carrier and the end face of the carrier are completely covered by the cutting element so that the cutting region of the carrier is protected from erosion by the cutting element.

29. The soil working tool according to claim 17, wherein the mounting piece and the extension of the cutting element are completely supported by the front facing surface of the recess of the carrier and by the end face of the carrier, respectively.

* * * * *

UNITED STATES PATENT AND TRADEMARK OFFICE
CERTIFICATE OF CORRECTION

| | | |
|---|---|---|
| PATENT NO. | : 8,857,531 B2 | Page 1 of 1 |
| APPLICATION NO. | : 13/377857 | |
| DATED | : October 14, 2014 | |
| INVENTOR(S) | : Smeets et al. | |

It is certified that error appears in the above-identified patent and that said Letters Patent is hereby corrected as shown below:

In the Claims

In column 6, line 10, replace "defection" with --deflection--;
In column 6, line 14, after "element" delete "is";
In column 6, line 53, delete "transversely to the advance direction".

Signed and Sealed this
First Day of September, 2015

Michelle K. Lee
*Director of the United States Patent and Trademark Office*